Dec. 2, 1952

J. W. WIESMANN 2,619,828

WIRE DISTRIBUTING CELLULAR METAL FLOOR

Filed Oct. 1, 1948

2 SHEETS—SHEET 1

INVENTOR.
Joseph W. Wiesmann
BY
J. Stanley Churchill
ATTORNEY

Dec. 2, 1952     J. W. WIESMANN     2,619,828
WIRE DISTRIBUTING CELLULAR METAL FLOOR
Filed Oct. 1, 1948     2 SHEETS—SHEET 2

INVENTOR.
Joseph W. Wiesmann
BY
J. Stanley Churchill
ATTORNEY

Patented Dec. 2, 1952

2,619,828

UNITED STATES PATENT OFFICE 2,619,828

WIRE DISTRIBUTING CELLULAR METAL FLOOR

Joseph W. Wiesmann, Pittsburgh, Pa., assignor to H. H. Robertson Company, Pittsburgh, Pa., a corporation of Pennsylvania Application October 1, 1948, Serial No. 52,252

5 Claims. (Cl. 72—16)

This invention relates to a wire distributing cellular metal floor.

The invention has for an object to provide a novel and improved wire distributing cellular metal floor for use in the construction of a building and which is characterized by novel structure adapted to increase the capacity of the wiring system and wherein difficulties formerly encountered in providing for expansion of the system may be avoided in a simple and efficient manner.

With this general object in view and such others as may hereinafter appear, the invention consists in the wire distributing cellular metal floor and in the various structures, arrangements and combinations of parts hereinafter described and particularly defined in the claims at the end of this specification.

Figure 1:
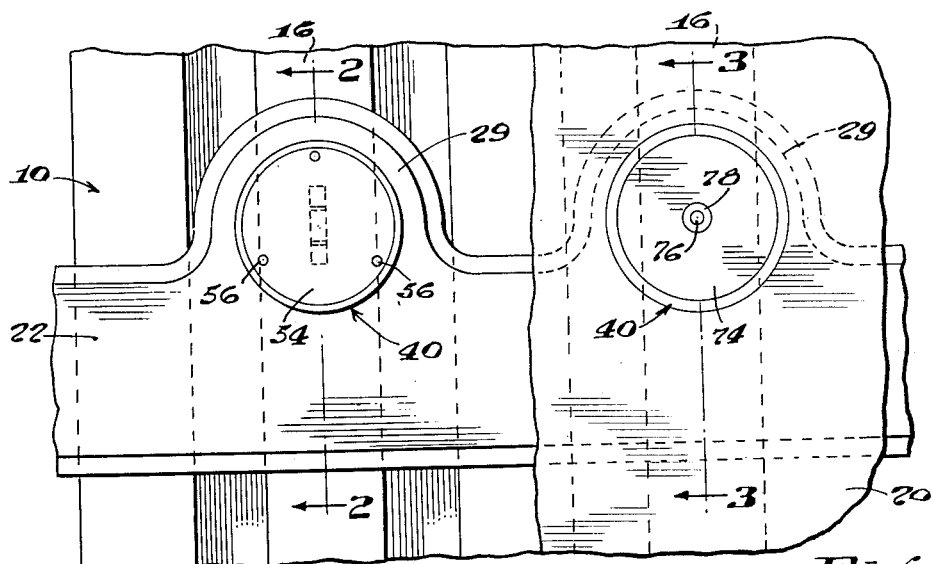
Figure 2:
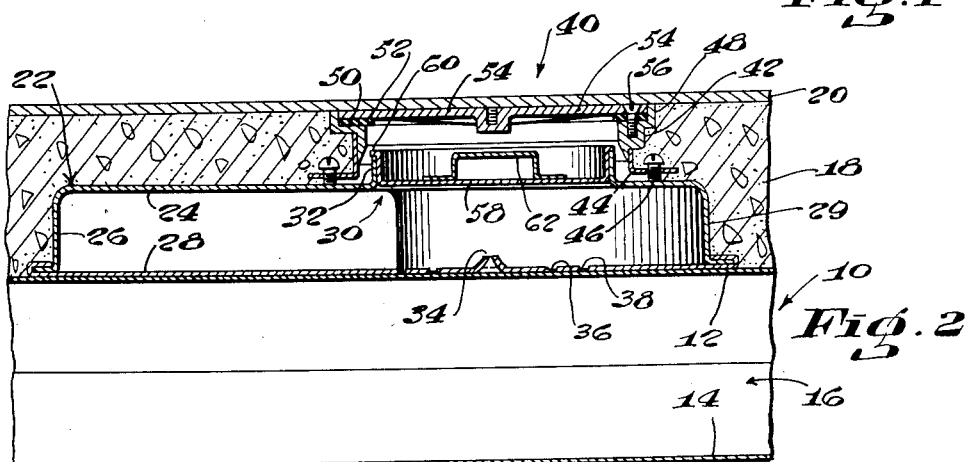
Figure 3:
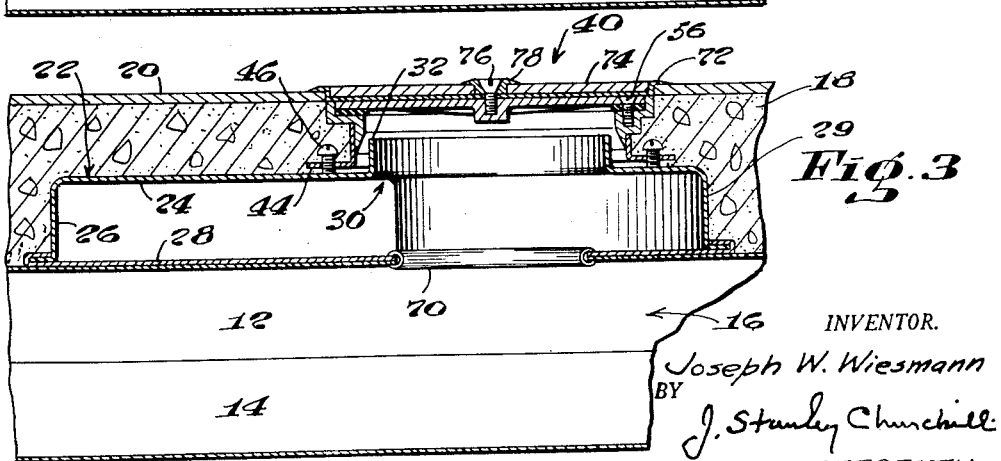
Figure 4:
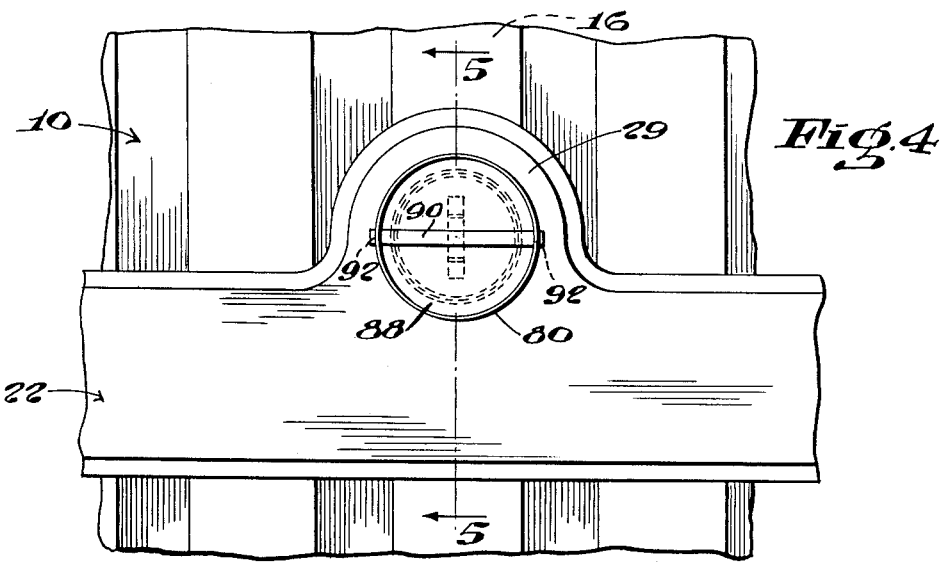
Figure 5:
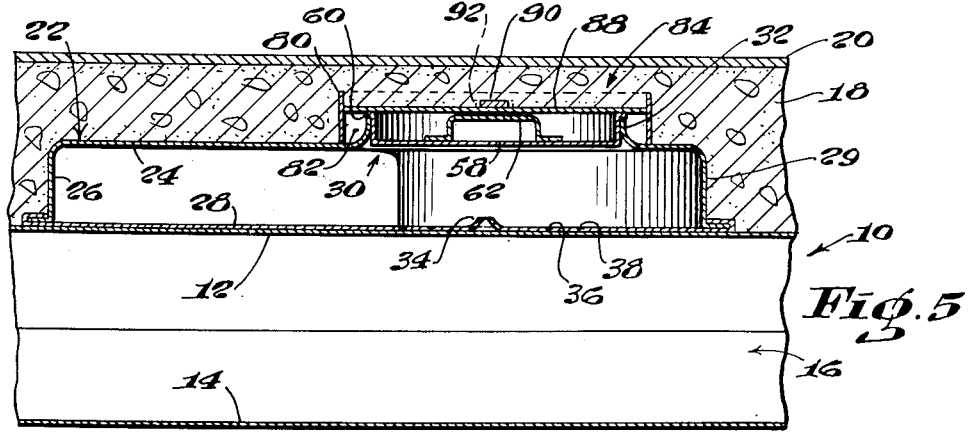
Figure 6:
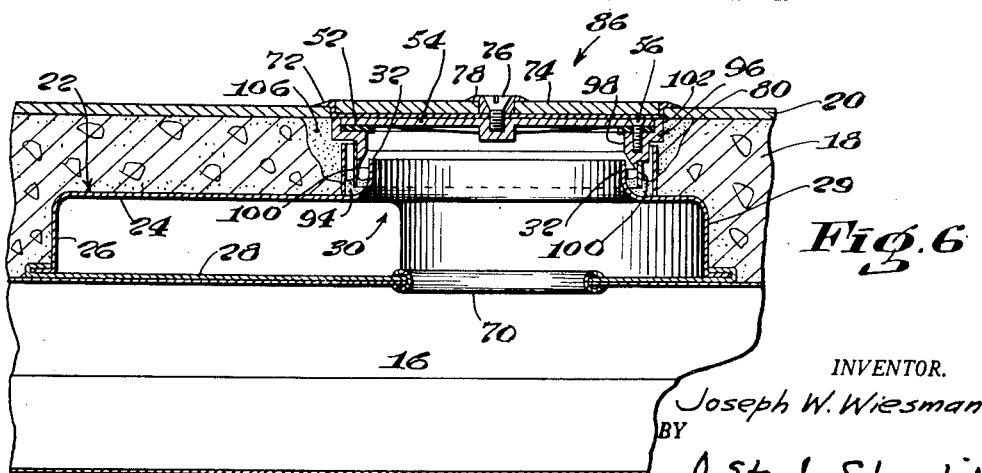

In the drawings illustrating the preferred embodiment of the invention, Fig. 1 is a plan view of a portion of a cellular metal floor embodying the present invention, Figs. 2 and 3 are cross-sectional views taken on the lines 2—2 and 3—3 respectively of Fig. 1, Fig. 4 is a plan view of a portion of a cellular metal floor embodying a modified form of the present invention, Fig. 5 is a cross-sectional view taken on the line 5—5 of Fig. 4, and Fig. 6 is a cross-sectional view similar to Fig. 5, but showing the access opening provided with the upper section of a junction unit.

In general, the present invention relates to an improvement in a wire distributing metal flooring system such as is disclosed in the United States patent to Young et al., No. 2,125,366. Such systems embody a multicellular metal flooring through which wires may be drawn to provide electrical service to different parts of the building. The wires are fed to the different cells by a cross over duct mounted to extend transversely of and preferably along the top of the multicellular flooring and through which the feed wires may be extended. The cross over ducts are provided with junction units at selected intersecting points of the duct with the cells thus providing access openings to permit electrical service to be furnished to selected of the flooring cells.

In the prior wire distributing floor, wherein the junction units or access openings were provided at the intersections defined by the longitudinal center lines of the duct and the cells difficulty has been encountered when the cross over duct became excessively crowded with wiring, in that when it was desired to extend the service through additional cells of the flooring the crowded wiring in the duct interfered with the use of tools for forming an opening through the duct and into the underlying flooring cell without withdrawing some of the wires from the duct or causing damage to the wires by the cutting tool.

In accordance with the present invention, the cross over duct is provided with offset portions at selected points in alignment with the spaced cells in the metal flooring, whereby to permit a through wire-way in the duct, and to facilitate forming an opening through the duct and into the underlying cell without interference from the existing wiring in the duct.

Referring now to the drawings, 10 represents one type of cellular metal flooring used in the erection of buildings and which may comprise a plurality of units formed by assembling and welding together an upper corrugated sheet 12 and a lower corrugated sheet 14 to form in effect a series of closely spaced parallel hollow beams or cells 16 upon which a concrete fill 18 is poured and the finish flooring 20 is laid, as illustrated in Fig. 2. In practice, it is preferred to manufacture the cellular metal floor in units of varying lengths according to the steel fabrication of the building in which the floor is to be incorporated, and during the erection of the floor, the units are laid end to end so that the cells of one unit cooperate with and form extensions of the cells of a second unit to provide a plurality of continuous elongated conduits extending across the building and through which wiring for electrical service of various types may be drawn.

As illustrated in Figs. 1 and 2, the preferred form of cross over duct comprises an elongated hollow rectangular shaped conduit 22 having an upper section provided with a top wall 24 and depending side walls 26 having their edges bent outwardly, and having a lower section 28 comprising the lower wall having its longitudinal marginal edges turned upwardly and inwardly to embrace the outwardly bent edges of the side walls 26, the upper and lower sections being preferably welded together to form an integral unit.

As illustrated in Fig. 1, in accordance with the present invention the cross over duct 22 is provided with a plurality of spaced offset portions each comprising a substantially semi-circular lateral extension 29 from one side thereof, and formed integrally with the cross over duct. The spaced offset portions 29 are arranged in alignment with selected of the underlying cells 16 of the metal flooring. Each offset portion is provided with a junction unit comprising an access opening 30 in the upper wall 24 thereof, each opening preferably being defined by an upstanding cylindrical wall or tubular extension 32. The lower wall 28 of the cross over duct is provided with a plurality of prefabricated spaced pilots, indicated generally at 34, in alignment with the access openings 30 and which are particularly adapted for the reception of a tool, such as a hole saw, to guide the tool when it is desired to complete an opening into a cell positioned below. The pilot 34 serves as the centering point for the hole saw, the lower wall being further provided with one or more cylindrical grooved portions 36, 38 arranged concentrically with the pilot, the grooves forming a guide for the hole saw in completing an entrance of a specified size into the cell positioned below.

Each access opening 30 is provided with a junction unit comprising an upper section having a cover member, indicated generally at 40, arranged concentrically with the upstanding tubular extension 32 of the access opening and, as herein shown, each upper section 40 comprises an intermediate annular collar 42 having flanged portions 44 at its lower edge provided with three radially and equally spaced screws 46 threaded therein arranged to engage the top wall 24 of the duct, the screws serving to adjust the upper section 40 with relation to the duct and to dispose the upper surface of the cover unit flush with the screed line of the concrete floor fill 18. As illustrated in Fig. 2, the upper portion of the annular section 42 of the cover member is provided with an outwardly and upwardly extended flange 48 forming a recessed opening 50 in the top thereof, arranged to receive a gasket 52 and a circular closure member 54 which may be held in place by screws 56.

As illustrated in Fig. 2, the access opening 30 may be further provided with a cup-shaped closure 58 arranged to fit snugly within the upstanding tubular extension 32. The cup-shaped closure may and preferably will be of substantially the same height as the tubular extension 32, and as herein shown may be provided with an outwardly extended flange 60 at its upper end arranged to rest against the upper edge or rim of the tubular extension 32. A handle 62 may be provided on the closure member 58 for convenience in removing and replacing the closure.

In the embodiment of the invention illustrated in Figs. 1, 2 and 3, each junction unit is provided with an upper section or cover member 40 so as to permit each and every junction unit to be immediately available to gain access into the duct 22 when it is desired to expand the electrical service to any part of the wire distributing floor, an unused junction unit being provided with the cup-shaped closure 58 and the top of the unit being concealed by the usual floor covering 20, as illustrated in Fig. 2. When a junction unit is to be used the floor covering 20 and the closure member 54 are removed, and the closure member 58 is withdrawn from the access opening 30 to permit the required opening to be made through the lower wall 28 of the duct and through the upper wall of the cell 16 as described, and when an opening is completed it may be provided with the usual bushing, such as a grommet 70, to provide a smooth edge around the opening and through which the wiring may be drawn without injury to the wires. Only the necessary openings through the duct and into the cell are completed, the remaining prefabricated pilots being available for future requirements.

From the description thus far, it will be seen that, in practice, when the cross over duct 22 becomes filled with wiring, the access opening disposed out of the through wiring area and in alignment with an underlying cell permits an opening through the lower wall 28 and cell 16 to be readily made in the field without interfering with the existing wiring. As illustrated in Fig. 3, when a floor covering is used, a floor covering adapter, comprising a circular flanged member 72, may be placed on top of the upper section 40 and provided with an insert 74 of the floor covering, the adapter being secured to the upper section by a central screw 76 and washer 78. In practice, the centrally disposed screw 76 and washer 78 may serve as a marker to assist in locating the equidistantly spaced units, and some of the units concealed by the floor covering 20 may be provided with similar markers for this purpose.

Referring now particularly to Figs. 4, 5, and 6, in accordance with the embodiment of the invention illustrated therein, a cross over duct 22 having offset portions 29 and tubular extensions 32, as above described, may be provided with a modified form of junction unit, and as herein shown only those access openings which are required to be made immediately available are provided with an upper section, indicated generally at 86, the remaining access openings being adapted to be covered over by the concrete floor fill 18 providing a completely concealed potential opening which may be made available for future use when desired. The modified embodiment of the invention thus effects substantial economies in the erection of the floor and installation of the wire distributing ducts in that only those upper sections 86 which are actually required for immediate use are provided in the initial installation of the floor.

As illustrated in Fig. 5, in the modified form of the invention, the upper wall 24 of the cross over duct 22 is further provided with an outer ring comprising an annular upstanding band 80 placed concentrically about the upstanding tubular extension 32 at each offset junction point, the band 80 being welded or otherwise secured to the upper wall 24. The upstanding band 80 may be of larger diameter and of greater height than the tubular extension 32, providing an annular space 82 between the extension and the band, as clearly shown in Fig. 5. In practice, an initially unused access opening 30 may be covered by suitable protective members, indicated generally at 84, over which the concrete floor fill 18 may be poured to provide an entirely concealed unit, and when it is desired to provide an immediately available junction unit, the concealed access opening is provided with an upper section 86, the opening being completed through the lower wall 28 of the duct and the top wall of the cell 16 for communication with the underlying cell as illustrated in Fig. 6.

Referring now particularly to Fig. 5, prior to the pouring of the floor fill, an unused access opening is first provided with a cup-shaped closure 58 arranged to fit snugly within the tubular extension 32, with the outwardly extended flange 60 at its upper end resting against and extending over the upper edge of the tubular extension 32, as previously described. A flat circular disk 88 is then fitted snugly within the upstanding band 80 and on top of the flanged portion 60 of the closure 58. The disk 88 may and preferably will be secured in place by a clip 90 extended diametrically across the disk 88 and projecting through opposed openings 92 formed in the band 80, as shown. The unused access opening is then covered by the concrete floor fill in the usual manner, the flat disk 88 providing a protective cover for the concealed access opening and for the annular space 82 between the tubular extension 32 and band 80, as clearly shown in Fig. 5.

When it is subsequently desired to make use of a concealed access opening, the concrete above the opening may be broken away, and the clip 90 and disk 88 then removed revealing the clean annular space 82. The space 82 is then provided with a suitable cement, such as iron cement indicated at 94, into which the lower portion of the junction unit section 86 is extended to secure the unit in place upon hardening of the cement. As shown in Fig. 6, the upper section 86 of the modified junction unit comprises an annular collar 96 having an inner depending flange 98 to which a circular band 100 may be secured, the lower portion of the band 100 being embedded in the cement 94. The annular member 96 is further provided with an outer upstanding flange 102 forming a circular recessed portion arranged to receive a gasket 52 and closure member 54 which may be secured to the collar 96 by screws 56 as above described. As illustrated, the unit is located with the top of the collar 96 and closure 54 flush with the screened line of the concrete floor fill 18. If the concrete fill has been excessively broken, the unit may be further grouted in by concrete, as indicated at 106 in Fig. 6.

The closure 58 may then be removed and the opening completed through the lower wall 28 and the top of the cell positioned below, the opening through the wall 28 being defined by the circular grooved portions 36, 38 concentric with the pilot 34 for guiding the hole saw in completing an entrance of a predetermined size into the cell below, the cut opening being preferably provided with a grommet 70, as previously described. In the modified form of the invention shown in Fig. 6 a floor covering adapter 72 may be similarly placed on top of the junction unit and provided with an insert 74 of the floor covering, the adapter being secured to the junction unit closure 54 by a central screw 76, and washer 78, the centrally disposed screw 76 serving as a marker to assist in locating the equidistantly spaced and concealed units.

It will be understood that when the modified form of wire distributing floor is initially installed, an upper section 86 is provided at those junction points where they are known to be immediately required, and are placed in position before the concrete fill is applied, the remaining junction points being provided with the covering disk 88 and covered over with the concrete fill as shown in Fig. 5.

From the above description of the different embodiments of the invention it will be seen that the present structures of cross over ducts providing junction units at offset portions of the duct, disposed out of the path of a straight run through the duct, enables additional access openings to be completed when required without damage to or interference with the existing wiring in the cross over duct, thereby increasing the capacity and permitting expansion of the service as subsequently required in a simple, convenient and practical manner.

The particular means for closing the unused access openings disclosed herein to permit the subsequent erection of the junction box forms the subject of my copending application Serial No. 52,251.

While the preferred embodiment of the invention has been herein illustrated and described, it will be understood that the invention may be embodied in other forms within the scope of the following claims.

Having thus described the invention, what is claimed is:

1. In a wire distributing cellular metal floor having longitudinally extended wire distributing cells, a cross over duct extending transversely of and on top of said cells, said cross over duct comprising an elongated hollow member forming a through wire way and having a plurality of laterally extended offset portions disposed beyond the adjacent side wall of the cross over duct and out of the path of the wiring in said through wire way and spaced in alignment with a plurality of the underlying wire distributing cells, said offset portions each having an access opening in the top wall thereof the major portion of which is disposed beyond the adjacent side wall of the cross over duct whereby to permit access to the interior of the offset portion of the cross over duct, enabling an opening to be made into an underlying wire distributing cell without interference with the existing wiring in said cross over duct.

2. In a wire distributing cellular metal floor having longitudinally extended wire distributing cells, a cross over duct extending transversely of and on top of said cells, said cross over duct comprising an elongated hollow member forming a through wire way and having a plurality of laterally extended offset portions formed integrally with the duct and disposed beyond the adjacent side wall of the cross over duct and out of the path of said through wire way and spaced in alignment with a plurality of the underlying wire distributing cells, said offset portions each having an access opening in the top wall thereof the major portion of which is disposed beyond the adjacent side wall of the cross over duct adapted for communication with an upper section of a junction unit to permit access to the duct, said offset portions enabling an opening to be completed into an underlying cell without interference with the existing wiring in said cross over duct.

3. In a wire distributing cellular metal floor having longitudinally extended wire distributing cells, a cross over duct extending transversely of and on top of said cells, said cross over duct comprising an elongated hollow member forming a through wire way and having a plurality of laterally extended offset portions formed integrally with the duct and in vertical alignment with a plurality of the underlying wire distributing cells, each of said offset portions having an access opening in the top wall thereof defined by an upstanding tubular extension from said wall adapted for communication with the upper section of a junction unit to permit access to the duct, said offset portions and said access openings having their major portions disposed beyond the path of the wiring in the through wire way thus enabling an opening to be completed into an underlying cell without interference with the existing wiring in said cross over duct.

4. In a wire distributing cellular metal floor having longitudinally extended wire distributing cells, a cross over duct extending transversely of and on top of said cells, said cross over duct comprising an elongated hollow member forming a through wire way and having a plurality of laterally extended offset portions disposed out of the path of said through wire way and in alignment with a plurality of the underlying wire distributing cells, each of said offset portions having an access opening in the top wall thereof defined by an upstanding tubular extension from said wall, means spaced from and forming with said extension and said top wall an annular recess to support therein the upper section of a junction unit to permit access to the duct, said offset portions and said access openings having their major portions disposed beyond the path of the wiring in the through wire way thus enabling an opening to be completed into an underlying cell without interference with the existing wiring in said cross over duct.

5. In a wire distributing cellular metal floor having longitudinally extended wire distributing cells, a cross over duct extending transversely of and on top of said cells, said cross over duct comprising an elongated hollow member forming a through wire way and having a plurality of laterally extended offset portions disposed out of the path of said through wire way and in alignment with a plurality of the underlying wire distributing cells, said offset portions each having an access opening in the top wall thereof defined by an upstanding tubular extension from said wall, means spaced from and forming with said extension and said top wall an annular recess to support therein an upper section of a junction unit to permit access to the duct, and a closure member covering each of selected and initially unused access openings and also the annular recesses to protect the latter from the subsequently poured floor fill, said closure members being adapted for removal upon breaking through the floor fill to permit insertion of an upper section of a junction unit into said annular recess when subsequently required, said offset portions and said access openings having their major portions disposed beyond the path of the wiring in the through wire way thus enabling an opening to be completed into an underlying cell without interference with the existing wiring in said cross over duct.

JOSEPH W. WIESMANN.

REFERENCES CITED

The following references are of record in the file of this patent:

UNITED STATES PATENTS

| Number | Name | Date |
| --- | --- | --- |
| 437,126 | Loth | Sept. 23, 1890 |
| 2,041,965 | Sargent | May 26, 1936 |
| 2,125,366 | Young | Aug. 2, 1938 |
| 2,445,197 | Wiesmann | July 13, 1948 |